United States Patent
Suzuki et al.

(10) Patent No.: US 10,336,195 B2
(45) Date of Patent: Jul. 2, 2019

(54) VEHICLE CONTROL APPARATUS AND VEHICLE CONTROL METHOD

(71) Applicant: HITACHI AUTOMOTIVE SYSTEMS, LTD., Hitachinaka-shi, Ibaraki (JP)

(72) Inventors: Keisuke Suzuki, Kawasaki (JP); Satoshi Kaneko, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 129 days.

(21) Appl. No.: 15/300,973

(22) PCT Filed: Apr. 2, 2015

(86) PCT No.: PCT/JP2015/060485
§ 371 (c)(1),
(2) Date: Sep. 30, 2016

(87) PCT Pub. No.: WO2015/152377
PCT Pub. Date: Oct. 8, 2015

(65) Prior Publication Data
US 2017/0021731 A1   Jan. 26, 2017

(30) Foreign Application Priority Data
Apr. 4, 2014   (JP) .................... 2014-077698

(51) Int. Cl.
*B60L 7/26*   (2006.01)
*B60L 15/20*   (2006.01)
*B60T 8/1755*   (2006.01)

(52) U.S. Cl.
CPC ............. *B60L 7/26* (2013.01); *B60L 15/2009* (2013.01); *B60T 8/1755* (2013.01);
(Continued)

(58) Field of Classification Search
None
See application file for complete search history.

(56) References Cited

U.S. PATENT DOCUMENTS

2002/0180266 A1   12/2002   Hara et al.
2005/0060082 A1*   3/2005   Heuer ................ B60G 17/0162
                                                      701/70

(Continued)

FOREIGN PATENT DOCUMENTS

EP   1 698 507 A1   9/2006
EP   2 623 386 A1   8/2013

(Continued)

*Primary Examiner* — Nicholas K Wiltey
(74) *Attorney, Agent, or Firm* — Foley & Lardner LLP

(57) ABSTRACT

An object of the present invention is to provide a vehicle control apparatus capable of stabilizing a behavior of a vehicle when a regenerative braking force is generated. To achieve this object, a vehicle control apparatus according to one aspect of the present invention includes an electric motor configured to provide a regenerative braking force to left and right drive wheels that are one of front wheels and rear wheels, a friction braking device configured to provide a friction braking force to left and right trailer wheels that are the other of the front wheels and the rear wheels, and a behavior estimation unit configured to estimate a behavior of a vehicle. The vehicle control apparatus reduces the regenerative braking force and increases the friction braking force provided by the friction braking device, if the behavior estimation unit estimates a preset behavior when the regenerative braking force is generated.

15 Claims, 9 Drawing Sheets

(52) U.S. Cl.
CPC ....... *B60L 2240/12* (2013.01); *B60L 2240/22* (2013.01); *B60L 2240/24* (2013.01); *B60L 2240/423* (2013.01); *B60L 2250/26* (2013.01); *B60L 2260/44* (2013.01); *B60T 2270/613* (2013.01); *Y02T 10/645* (2013.01); *Y02T 10/7275* (2013.01)

(56) References Cited

U.S. PATENT DOCUMENTS

| | | |
|---|---|---|
| 2006/0196712 A1 | 9/2006 | Toyota et al. |
| 2010/0113215 A1* | 5/2010 | Jager .................. B60L 7/26 477/29 |
| 2011/0125368 A1* | 5/2011 | Yokota ................ B60T 8/17554 701/41 |
| 2013/0211644 A1* | 8/2013 | Yokoyama ................ B60L 7/18 701/22 |
| 2016/0229391 A1* | 8/2016 | Shigemoto ............... B60K 6/48 |

FOREIGN PATENT DOCUMENTS

| | | |
|---|---|---|
| JP | 2002-356151 A | 12/2002 |
| JP | 2006-246657 A | 9/2006 |
| JP | 2012-056367 A | 3/2012 |
| JP | 2012-060753 A | 3/2012 |
| JP | 2013-163422 A | 8/2013 |
| WO | WO-2009/027790 A1 | 3/2009 |

\* cited by examiner

VEHICLE CONTROL APPARATUS AND VEHICLE CONTROL METHOD

TECHNICAL FIELD

The present invention relates to an apparatus for controlling a vehicle.

BACKGROUND ART

Conventionally, there has been known a technique discussed in Patent Literature 1 as an apparatus for controlling a vehicle. This patent literature aims at stabilization of a behavior of the vehicle by limiting a regenerative braking force when there is a large difference between speeds of front and rear wheels.

CITATION LIST

Patent Literature

PTL 1: Japanese Patent Application Public Disclosure No. 2012-60753

SUMMARY OF INVENTION

Technical Problem

However, for example, when a vehicle equipped with an electric motor on the front wheels is running on a low μ road, an understeer tendency may occur despite of no sufficient difference made between the speeds of the front and rear wheels. In this case, an inability to reduce a regenerative braking force may cause drive wheels to be locked at an early stage due to a braking force excessively allocated to the regenerative braking force (hereinafter referred to as a braking force excessively allocated to the drive wheels), making the vehicle instable. The present invention has been made in consideration of the above-described problem, and an object thereof is to provide a vehicle control apparatus capable of stabilizing the behavior of the vehicle when the regenerative braking force is generated.

Solution to Problem

To achieve the above-described object, a vehicle control apparatus according to one aspect of the present invention includes an electric motor configured to provide a regenerative braking force to left and right drive wheels that are one of front wheels and rear wheels, a friction braking device configured to provide a friction braking force to left and right trailer wheels that are the other of the front wheels and the rear wheels, and a behavior estimation unit configured to estimate a behavior of a vehicle. The vehicle control apparatus reduces the regenerative braking force and increases the friction braking force provided by the friction braking device, if the behavior estimation unit estimates a preset behavior when the regenerative braking force is generated.

DESCRIPTION OF EMBODIMENTS

First Embodiment

Figure 1:
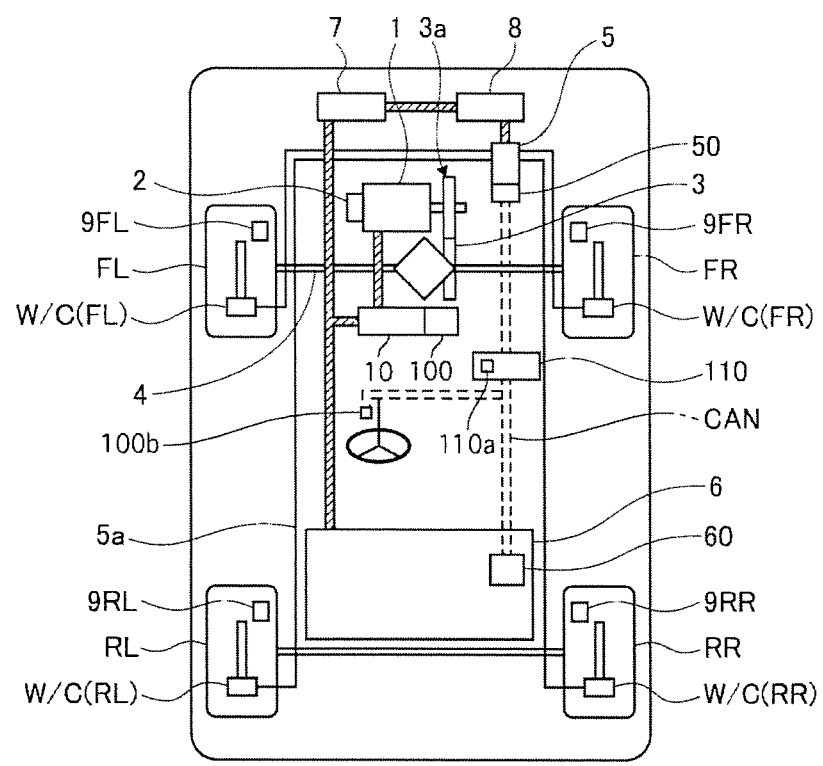
FIG. 1 illustrates a system indicating a configuration of an electric vehicle according to a first embodiment.

FIG. 1 is a system diagram illustrating a configuration of an electric vehicle according to a first embodiment. The electric vehicle is a front-wheel drive vehicle, and includes front wheels FR and FL, which are drive wheels, and rear wheels RR and RL, which are trailer wheels. Each of the wheels is provided with a wheel cylinder W/C(FR), W/C(FL), W/C(RR), or W/C(RL) (also referred to as simply W/C), which presses brake pads against a brake rotor rotating integrally with a tire to thereby generate a friction braking force, and a wheel speed sensor 9(FR), 9(FL), 9(RR), or 9(RL) (also referred to as simply 9), which detects a wheel speed of each of the wheels. A hydraulic unit 5 is connected to the wheel cylinder W/C via a hydraulic pipe 5a, thereby forming a hydraulic brake. Further, the electric vehicle includes a steering angle sensor 110b (corresponding to a steering angle calculation unit), which detects a steering angle indicating an amount of a steering operation performed by a driver.

The hydraulic unit 5 includes a plurality of electromagnetic valves, a reservoir, a pump motor, and a brake controller 50, and controls a wheel cylinder hydraulic pressure at each of the wheels by controlling driving states of various kinds of electromagnetic valves and the pump motor, based on an instruction from the brake controller 50. The brake controller 50 includes a yaw rate sensor 110a, which detects a yaw rate of the vehicle. The hydraulic unit 5 may be a well-known brake-by-wire unit, or may be a brake unit including a hydraulic circuit capable of realizing vehicle stability control. The type of the hydraulic unit 5 is not especially limited.

An electric motor 1, which serves as a driving source, is provided with a resolver 2, which detects a rotational angle of the motor, and detects the rotational angle of the motor and also detects a rotational speed of the motor, based on a signal of the resolver. A differential gear 3 is connected to the electric motor 1 via a speed reduction mechanism 3a, and the front wheels FR and FL are connected to a drive shaft 4 connected to the differential gear 3. A high-voltage battery 6 and a batter controller 60 are mounted on a rear side of the vehicle. The high-voltage battery 6 supplies driving power to the electric motor 1 or collects regenerated power. The battery controller 60 monitors and controls a battery state of the high-voltage battery 6. An inverter 10, which is disposed between the high-voltage battery 6 and the electric motor 1, is controlled by a motor controller 100. Further, an auxiliary device battery 8 is connected to the high-voltage battery 6 via a DC-DC converter 7, and functions as a power source for driving the hydraulic unit 5. The electric vehicle according to the first embodiment is provided with a CAN communication line that is an in-vehicle communication line to which a plurality of controllers mounted on the vehicle are connected, whereby the steering angle sensor 110*b*, the brake controller 50, a vehicle controller 110, the battery controller 60, and the like are connected to one another so as to be able to communicate information.

Figure 2:
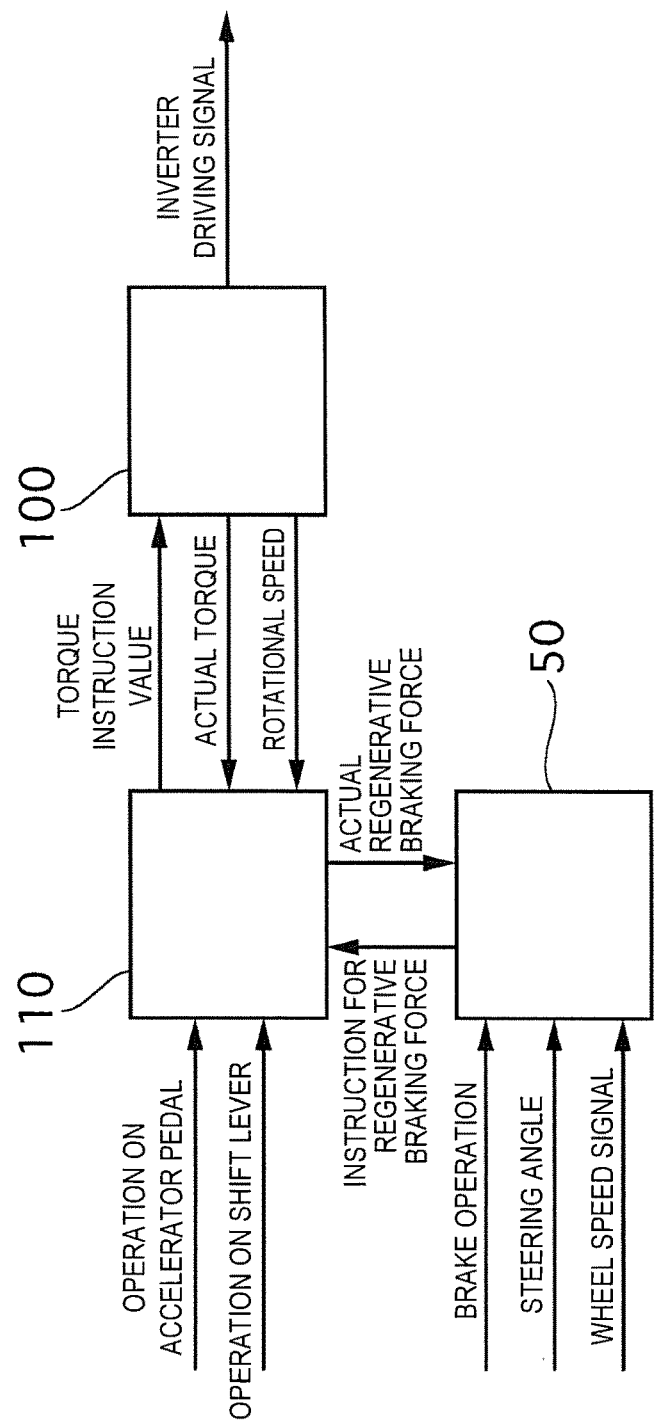
FIG. 2 is a control block diagram illustrating a content of information transmitted and received by each controller according to the first embodiment.

FIG. 2 is a control block diagram illustrating a content of information transmitted and received by each of the controllers according to the first embodiment. The vehicle controller 110 receives an input of information indicating a position of an accelerator pedal and information indicating a position of a shift lever, calculates a torque instruction value based on a basic braking force requested by the driver and a result of an instruction value for a regenerative braking force from the brake controller 50, and outputs the torque instruction value to the motor controller 100. The brake controller 50 receives an input of information indicating a driver's intention to brake the vehicle, such as an ON/OFF state of a brake switch, which indicates an operation state of a brake pedal, and a stroke amount of the brake pedal or a pressing force applied to the brake pedal. The stroke controller 50 further receives an input of a steering angle, a yaw rate, and a signal indicating a wheel speed signal of each of the wheels. Then, the stroke controller 50 calculates a brake hydraulic pressure to be supplied to the wheel cylinder W/C and a regenerative braking force to be generated by the electric motor 1, and outputs the instruction value for the regenerative braking force to the vehicle controller 110. The brake controller 50 receives information indicating an actual regenerative braking force from the vehicle controller 110, thereby performing regenerative braking force feedback control for compensating for the regenerative braking force insufficient to meet the instruction by using a friction braking force. The motor controller 100 controls an operation state of the electric motor 1 based on the torque instruction value, and also outputs the information indicating the actual regenerative braking force generated by the electric motor 1 to the vehicle controller 110, based on the detected actual regenerative braking force of the motor, the rotational speed of the motor, a current value, and the like.

(Details of Control in Controller)

Figure 3:
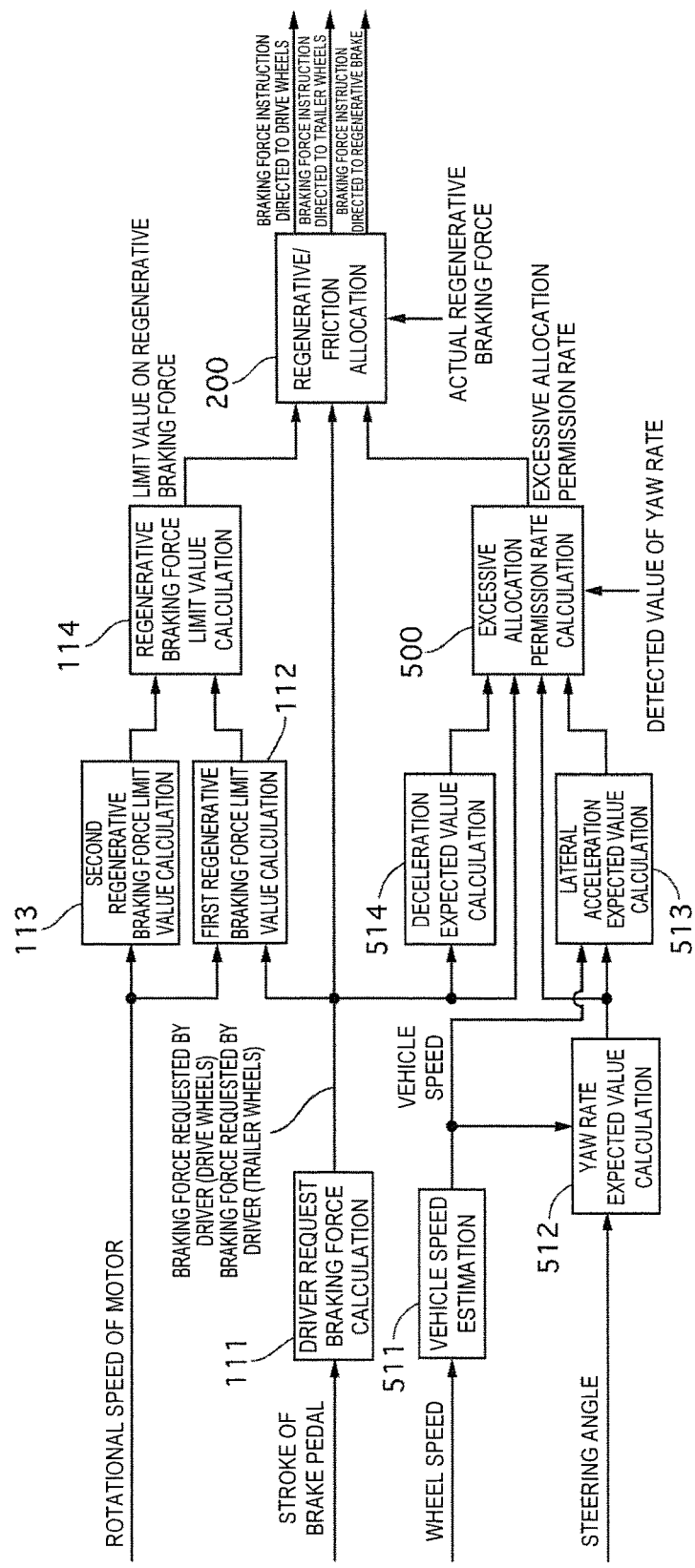
FIG. 3 is a control block diagram illustrating a control configuration provided in a brake controller according to the first embodiment for outputting a request for a braking force.

FIG. 3 is a control block diagram illustrating a control configuration provided in the brake controller according to the first embodiment for outputting the request for the braking force. A driver request braking force calculation unit 111 calculates the braking force requested by the driver based on the operation state of the brake pedal. As the braking force requested by the driver, a braking force requested by the driver on the drive wheel side and a braking force requested by the driver on the trailer wheel side are individually calculated. A first regenerative braking force limit value calculation unit 112 calculates a first limit value on the regenerative braking force due to a regeneration limit, based on the rotational speed of the motor. For example, when the motor rotates at a low speed, the regenerative braking force is reduced according to the reduction in the speed. The regenerative braking force is reduced in consideration of unnecessity of the regeneration in a region where regenerative energy does not return to the high-voltage battery 6 when the speed is low, presence of a risk that the vehicle may move backward unless the regenerative braking force is reduced to zero by the time that the vehicle is stopped, and presence of a risk that a stable braking force may be unable to be acquired because torque controllability of the electric motor 1 is deteriorated when the speed is low. A second regenerative braking force limit value calculation unit 113 calculates a second limit value on the regenerative braking force based on a limit on the braking force using the motor, based on the rotational speed of the motor. The motor has a rating capacity, and therefore has a limit value on the braking force using the motor that can be generated with respect to the rotational speed of the motor. Therefore, the second regenerative braking force limit value calculation unit 113 calculates the second limit value on the regenerative braking force from the rotational speed of the motor, based on a preset motor characteristic map or the like. A regenerative braking force limit value calculation unit 114 calculates a final limit value on the regenerative braking force by selecting a lower one of the first limit value on the regenerative braking force and the second limit value on the regenerative braking force.

A vehicle speed estimation unit 511 estimates a vehicle speed based on the detected signal indicating the wheel speed. More specifically, the vehicle speed estimation unit 511 may employ an average wheel speed of all the wheels, employ an average wheel speed on the rear wheel (trailer wheel) side, or employ a highest wheel speed value. Further, the vehicle speed estimation unit 511 may be configured to correct the vehicle speed based on a deceleration of a vehicle body or the like. The method for this estimation is not especially limited. A yaw rate expected value calculation unit 512 calculates an expected value of the yaw rate, which is a yaw rate that should be achieved by the vehicle, based on the vehicle speed and the steering angle. A lateral acceleration expected value calculation unit 513 calculates an expected value of a lateral acceleration, which is a lateral acceleration that should be achieved by the vehicle, based on the vehicle speed and the expected value of the yaw rate. A relationship between the yaw rate and the lateral acceleration of the vehicle may be calculated based on, for example, a motion equation using a bicycle car model, or may be calculated based on a relational expression approximate to a correlation therebetween. A deceleration expected value calculation unit 514 calculates an expected value of the deceleration that is expected by the driver, based on the braking force requested by the driver. An excessive allocation permission rate calculation unit 500 calculates an excessive allocation permission rate, which indicates a braking force allocated to the front wheel side serving as the drive wheels that is excessive compared to a reference ratio of allocation of the braking force between the front and rear wheels, based on the expected value of the deceleration, the braking force requested by the driver, the expected value of the yaw rate, and the expected value of the lateral acceleration. Details thereof will be described below. A regenerative/friction allocation unit 200 outputs various kinds of braking force instructions based on the braking force requested by the driver, the limit value on the regenerative braking force, the excessive allocation permission rate, and the actual regenerative braking force. As a braking force instruction directed to the drive wheels, the regenerative/friction allocation unit 200 outputs a hydraulic instruction value for generating a braking force capable of compensating for the insufficiency of the regenerative braking force generated by the electric motor 1. As a braking force instruction directed to the trailer wheels, the regenerative/friction allocation unit 200 outputs a hydraulic instruction value to the trailer wheels. As the braking force instruction directed to the regenerative brake, the regenerative/friction allocation unit 200 outputs the instruction value for the regenerative braking force.

(Processing for Calculating Excessive Allocation Permission Rate)

Figure 4:
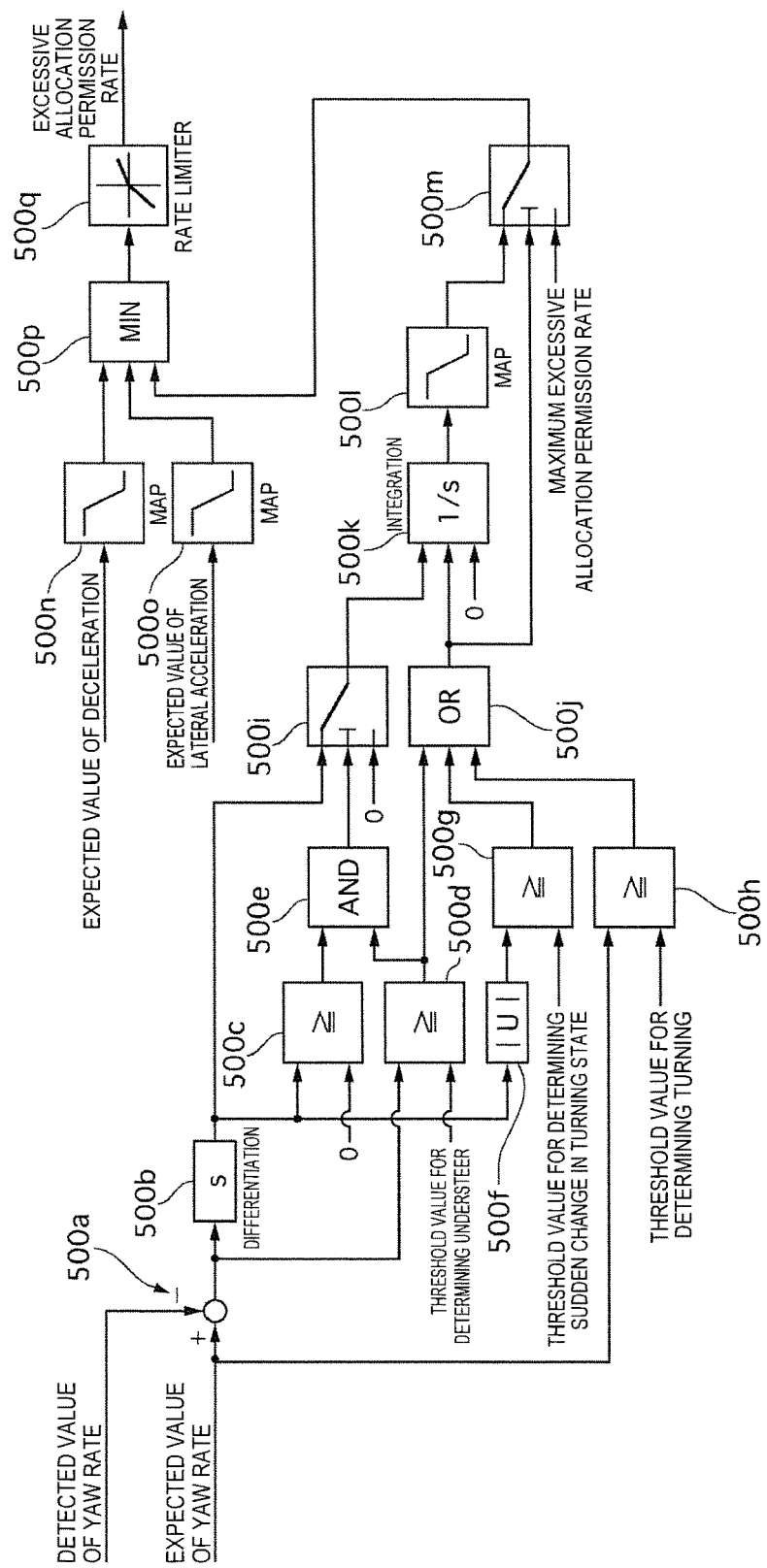
FIG. 4 is a control block diagram illustrating processing for calculating an excessive allocation permission rate according to the first embodiment.

FIG. 4 is a control block diagram illustrating processing for calculating the excessive allocation permission rate according to the first embodiment. A yaw rate deviation calculation unit 500a calculates a yaw rate deviation, which is a difference acquired by subtracting a detected value of the yaw rate detected by the yaw rate sensor 110a from the expected value of the yaw rate. A deviation differentiation unit 500b calculates a differential value of the yaw rate deviation by differentiating the yaw rate deviation. A yaw rate deviation differential value determination unit 500c determines whether the differential value of the yaw rate deviation is zero or larger. If the differential value of the yaw rate deviation is zero or larger, the yaw rate deviation differential value determination unit 500c determines that the yaw rate deviation is increasing and outputs an ON signal. On the other hand, if the differential value of the yaw rate deviation is a negative value, it is considered that the yaw rate deviation is reducing and the vehicle is shifting from an understeer tendency to a neutral steer tendency. In this case, performing control for stopping or reducing the understeer may cause oversteer, so that the yaw rate deviation differential value determination unit 500c outputs an OFF signal in this case. An understeer determination unit 500d determines whether the yaw rate deviation is equal to or larger than a preset threshold value prepared for determining the understeer. Then, if the yaw rate deviation is equal to or larger than the threshold value prepared for determining the understeer, the understeer determination unit 500d outputs an ON signal. On the other hand, if the yaw rate deviation is smaller than the threshold value prepared for determining the understeer, the understeer determination unit 500d outputs an OFF signal. An understeer condition determination unit 500e determines whether the yaw rate deviation differential value determination unit 500c outputs the ON signal and the understeer determination unit 500d outputs the ON signal. If the conditions are satisfied, the understeer condition determination unit 500e outputs an ON signal. On the other hand, if the conditions are not satisfied, the understeer condition determination unit 500e outputs an OFF signal.

An absolute value calculation unit 500f calculates an absolute value of the differential value of the yaw rate deviation. A turning state sudden change determination unit 500g determines whether the absolute value of the differential value of the yaw rate deviation is equal to or larger than a preset threshold value prepared for determining a sudden change in a turning state. If the absolute value of the differential value of the yaw rate deviation is equal to or larger than the threshold value prepared for determining the sudden change in the turning state, the turning state sudden change determination unit 500g determines that the turning state is suddenly changed and outputs an ON signal. On the other hand, if the absolute value of the differential value of the yaw rate deviation is smaller than the threshold value prepared for determining the sudden change in the turning state, the turning state sudden change determination unit 500g determines that the turning state is stabilized and outputs an OFF signal. A turning determination unit 500h determines whether the expected value of the yaw rate is equal to or larger than a preset threshold value prepared for determining the tuning. If the expected value of the yaw rate is equal to or larger than the threshold value prepared for determining the tuning, the turning determination unit 500h determines that the driver is indicating his/her intension to turn the vehicle, and outputs an ON signal. On the other hand, if the expected value of the yaw rate is smaller than the threshold value prepared for determining the tuning, the turning determination unit 500h determines that the driver does not have an intension to turn the vehicle, and outputs an OFF signal.

A vehicle behavior determination unit 500i switches an output thereof based on the ON/OFF signal from the understeer condition determination unit 500e. By this switching, the vehicle behavior determination unit 500i outputs the differential value of the yaw rate deviation if the understeer condition determination unit 500e outputs the ON signal. On the other hand, the vehicle behavior determination unit 500i outputs zero if the understeer condition determination unit 500e outputs the OFF signal.

A turning state determination unit 500j outputs an ON signal, if any of the conditions, the output of the ON signal from the understeer determination unit 500d, the output of the ON signal from the turning state sudden change determination unit 500g, and the output of the ON signal from the turning determination unit 500h is satisfied. On the other, the turning state determination unit 500j outputs an OFF signal if none of the conditions is satisfied. An integration unit 500k switches an output thereof based on the ON/OFF signal from the turning state determination unit 500j. By this switching, the integration unit 500k integrates the differential value of the yaw rate deviation and outputs the integral value as the yaw rate deviation if the turning state determination unit 500j outputs the ON signal, because the vehicle is being turned at this time. On the other hand, the integration unit 500k determines that the vehicle is not being turned and outputs zero if the turning state determination unit 500j outputs the OFF signal.

An excessive allocation permission rate map 500l outputs the excessive allocation permission rate from a preset map, based on the calculated integral value. The excessive allocation permission rate indicates a rate at which the braking force allocated to the rear wheel side is reduced from ideal allocation of the braking force between the front and rear wheels, and the reduced braking force is allocated to the front wheel side. For example, if the yaw rate deviation is small and the intension to turn the vehicle is not clear, a cornering force is not necessary so much on the front wheel side. Therefore, the braking force is permitted to be allocated to the front wheel side as much as possible. In other words, the excessive allocation permission rate is increased, so that power is collected at a higher rate. On the other hand, if the yaw rate deviation is large and the understeer tendency or the intention to turn the vehicle is clear, the cornering force is required on the front wheel side. Therefore, a limitation is imposed on the allocation of the braking force to the front wheel side. In other words, the excessive allocation permission rate is reduced (a value set when the integral value is zero: this rate may be a low predetermined permission rate or may be even zero), so that a turning capability is secured.

A maximum excessive allocation permission rate limit unit 500m switches an output thereof based on the ON/OFF signal from the turning state determination unit 500j. By this switching, the maximum excessive allocation permission rate limit unit 500m outputs a preset maximum excessive allocation permission rate if the turning state determination unit 500j outputs the OFF signal. On the other hand, the maximum excessive allocation permission rate limit unit 500*m* outputs the excessive allocation permission rate calculated by the excessive allocation permission rate map 500*l* if the turning state determination unit 500*j* outputs the ON signal. The maximum excessive allocation permission rate is a value that limits a maximum value when the braking force is allocated to the front wheel side. Therefore, the braking force may be allocated in such a manner that the vehicle is braked entirely at the front wheels, or a slightly lower allocation rate may be set.

A deceleration limit unit 500*n* outputs the excessive allocation permission rate based on the deceleration from a preset map, based on the calculated expected value of the deceleration. When the expected value of the deceleration is large, the excessive allocation permission rate is reduced. By this reduction, the drive wheels are prevented from being locked at an early stage when the vehicle is running on a high μ road. On the other hand, when the expected value of the deceleration is small, the drive wheels are less likely locked, whereby the excessive allocation permission rate is increased, so that the power can be collected at a higher rate.

A lateral acceleration limit unit 500*o* outputs the excessive allocation permission rate based on the lateral acceleration from a preset map, based on the calculated expected value of the lateral acceleration. By this output, the drive wheels are prevented from being locked at the early stage when the vehicle is running on the high μ road. At this time, the excessive allocation permission rate based on the lateral acceleration is calculated with use of the expected value of the lateral acceleration instead of an actual lateral acceleration for the following reason. Assume that the vehicle is being turned with the braking force largely allocated to the front wheel side. When the vehicle is running on the high μ road, the lateral acceleration is actually generated, whereby a turning inner wheel side is subject to a reduced load and therefore is easily locked. Therefore, increasing the allocation of the braking force to the front wheel side is not desirable when the lateral acceleration is large, whereby the excessive allocation permission rate based on the lateral acceleration is reduced when the expected value of the lateral acceleration is large. When the vehicle is running on the high μ road, a result is not changed so much between the control using the actual lateral acceleration and the control using the expected value of the lateral acceleration. However, when the vehicle is running on a low μ road, the actually generated lateral acceleration is not as large as the expected value of the lateral acceleration. At this time, increasing the allocation of the braking force to the front wheel side because the generated actual lateral acceleration is small results in a reduction in the cornering force on the front wheel side, easily leading to the understeer tendency. Therefore, in this case, the excessive allocation permission rate based on the lateral acceleration is also reduced. In other words, calculating the excessive allocation permission rate based on the lateral acceleration with use of the expected value of the lateral acceleration can realize stabilization of a behavior of the vehicle regardless of μ on the road surface.

An excessive allocation permission rate setting unit 500*p* calculates a final excessive allocation permission rate by selecting a lowest one of the excessive allocation permission rate based on the deceleration, the excessive allocation permission rate based on the lateral acceleration, and the excessive allocation permission rate output from the maximum excessive allocation permission rate limit unit 500*m*. A rate limit unit 500*q* limits a rate at which the final excessive allocation permission rate output from the excessive allocation permission rate setting unit 500*p* is changed from a previous excessive allocation permission rate, to a predetermined change rate or lower. Therefore, if the change rate is equal to or lower than the predetermined change rate, the final excessive allocation permission rate is directly output. If the change rate is higher than the predetermined change rate, a predetermined change rate is output. This output can prevent or reduce a sudden change in the allocation of the braking force between the front and rear wheels, thereby realizing the stabilization of the behavior of the vehicle.

(Processing for Allocating Braking Force Between Regenerative Brake and Friction Brake)

Figure 5:
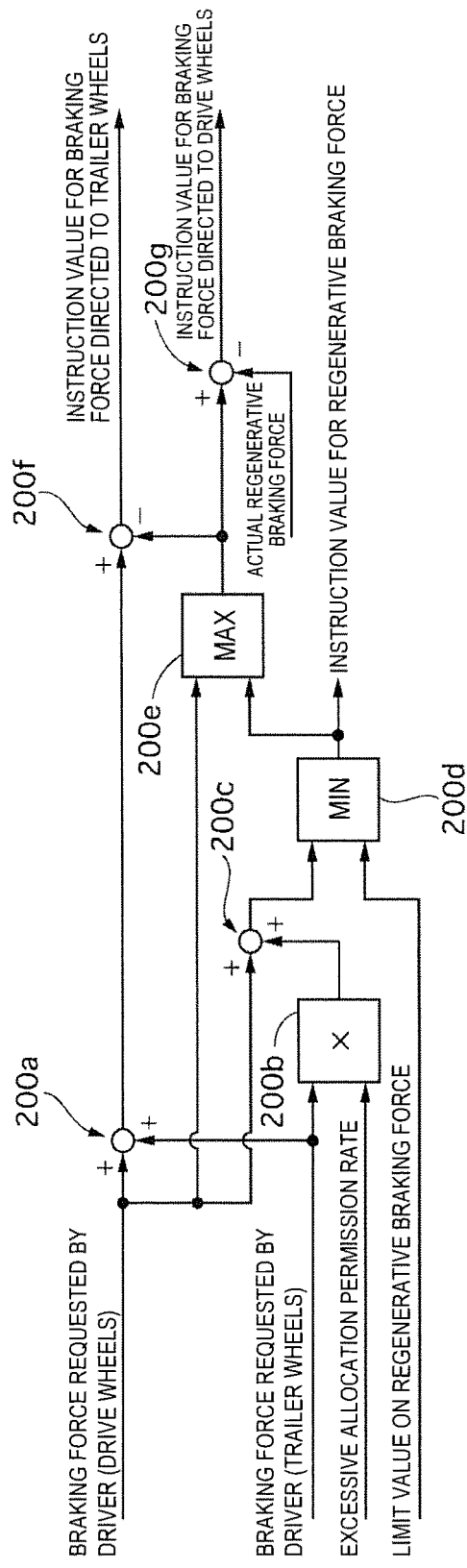
FIG. 5 is a control block diagram illustrating processing for allocating the braking force between a regenerative brake and a friction brake according to the first embodiment.

FIG. 5 is a control block diagram illustrating processing for allocating the braking force between the regenerative brake and the friction brake according to the first embodiment. A driver request total braking force calculation unit 200*a* adds the braking force requested by the driver on the drive wheel side (hereinafter also referred to as Fdd) and the braking force requested by the driver on the trailer wheel side (hereinafter also referred to as Fcd), and outputs a total braking force requested by the driver (Fdd+Fcd). An excessive allocation permission rate multiplication unit 200*b* multiplies the braking force requested by the driver on the trailer wheel side by the excessive allocation permission rate (hereinafter also referred to as p), thereby outputting (Fcd× p). An addition unit 200*c* adds Fdd and (Fcd×p), and outputs (Fdd+Fcd×p). A regenerative braking force instruction value calculation unit 200*d* outputs a value acquired by selecting a lower one of (Fdd+Fcd×p) and the limit value Fgmax on the regenerative braking force to the vehicle controller 110 as the instruction value for the regenerative braking force.

A drive wheel side total braking force instruction value calculation unit 200*e* outputs a larger one of Fdd and the instruction value for the regenerative braking force ((Fdd+ Fcd×p) or Fgmax) as an instruction value for the total braking force directed to the drive wheels. A trailer wheel braking force instruction value calculation unit 200*f* calculates an instruction value for the braking force directed to the trailer wheels by subtracting the instruction value for the total braking force directed to the drive wheels from the total braking force requested by the driver (Fdd+Fcd), and outputs a hydraulic instruction value according to the instruction value for the braking force directed to the trailer wheels to the hydraulic unit 5. A drive wheel braking force instruction value calculation unit 200*g* calculates an instruction value for the braking force directed to the drive wheels that should be generated by the hydraulic brake on the drive wheel side by subtracting the actual regenerative braking force actually generated at the electric motor 1 from the instruction value for the total braking force directed to the drive wheels, and outputs a hydraulic instruction value according to the instruction value for the braking force directed to the drive wheels to the hydraulic unit 5.

Specific Example 1

Now, how the present processing proceeds will be described referring to a specific example thereof in which, for example, the excessive allocation permission rate is set to 20% (p=0.2) and (Fdd+Fcd×p) is smaller than the limit value Fgmax on the regenerative braking force. First, Fcd×p is output from the excessive allocation permission rate multiplication unit 200*b*, and (Fdd+Fcd×p) is output from the addition unit 200*c* and the regenerative braking force instruction value calculation unit 200*d*. Since (Fdd+Fcd×p) is smaller than the limit value Fgmax on the regenerative braking force, (Fdd+Fcd×p) is set so as to be entirely generated as the regenerative braking force. Further, since (Fdd+Fcd×p) is larger than the braking force Fdd requested by the driver on the drive wheel side, (Fdd+Fcd×p) is output from the drive wheel side total braking force instruction value calculation unit 200e as the instruction value for the total braking force directed to the drive wheels. Therefore, (Fdd+Fcd×p) is set as the instruction value for the braking force directed to the drive wheels. However, this value may deviate from the actually generated regenerative braking force, whereby a difference therefrom is compensated for by the hydraulic brake on the drive wheel side. Further, the trailer wheel braking force instruction value calculation unit 200f subtracts the instruction value for the total braking force directed to the drive wheels (Fdd+Fcd×p) from the total braking force requested by the driver (Fdd+Fcd). With the excessive allocation permission rate set to p=0.2, (Fcd−0.2×Fcd)=0.8 Fcd is calculated, and this value is output as the instruction value for the braking force directed to the trailer wheel.

Specific Example 2

Next, how the present processing proceeds will be described referring to a specific example thereof in which, for example, the excessive allocation permission rate is set to 20%, the limit value Fgmax on the regenerative braking force is smaller than (Fdd+Fcd×p), and the braking force Fdd requested by the driver on the drive wheel side is larger than the limit value Fgmax on the regenerative braking force. In this case, the limit value Fgmax on the regenerative braking force is output from the regenerative braking force instruction value calculation unit 200d, and is set as the regenerative braking force. Further, the braking force Fdd requested by the driver on the drive wheel side is output from the drive wheel side total braking force instruction value calculation unit 200e. The drive wheel braking force instruction value calculation unit 200g compensates for a value acquired by subtracting the actual regenerative braking force from Fdd by using the hydraulic brake on the diving wheel side. Further, the trailer wheel braking force instruction value calculation unit 200f subtracts the braking force Fdd requested by the driver on the drive wheel side form the total braking force requested by the driver (Fdd+Fcd). Therefore, Fcd is directly output as the instruction value for the braking force directed to the trailer wheels.

(Regarding Excessive Allocation Permission Rate based on Expected Value of Lateral Acceleration)

Figure 6:
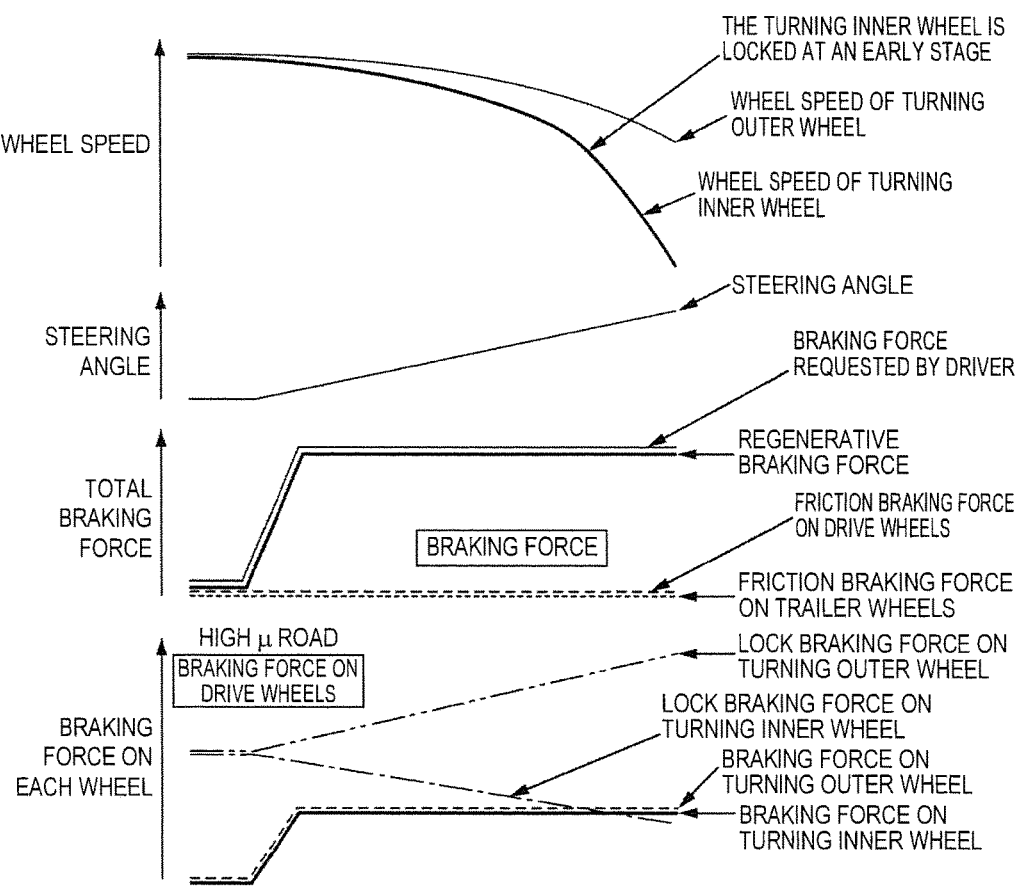
FIG. 6 is a timing diagram when the excessive allocation permission rate is not limited with a yaw rate deviation and an expected value of a lateral acceleration generated.

Next, a function of the excessive allocation permission rate based on the lateral acceleration that is limited by the lateral acceleration limit unit 500o will be described. FIG. 6 is a timing diagram when the excessive allocation permission rate is not limited when the yaw rate deviation or the expected value of the lateral acceleration is generated. FIG. 6 indicates that the vehicle is shifting to the turning state while being braked. Further, the excessive allocation permission rate p is set to 100% first. As the braking force, the braking force requested by the driver is entirely achieved by the regenerative braking force. Therefore, FIG. 6 illustrates the vehicle with no braking force generated at the driving and trailer wheels by the hydraulic brake.

When the vehicle is turned, the load is moved to a turning outer wheel side and is reduced on the turning inner wheel side. At this time, a lock braking force (the braking force applied to the wheel reaches or exceeds a frictional force between the wheel and the road surface) is increased on the turning outer wheel side, so that the drive wheel is not locked on the turning outer wheel side. However, the lock braking force is reduced on the turning inner wheel side to fall below the braking force applied to the drive wheel on the turning inner wheel side, so that the drive wheel is easily locked. In this case, the cornering force cannot be acquired on the front wheels, which makes it difficult to achieve the stabilized behavior of the vehicle.

Figure 7:
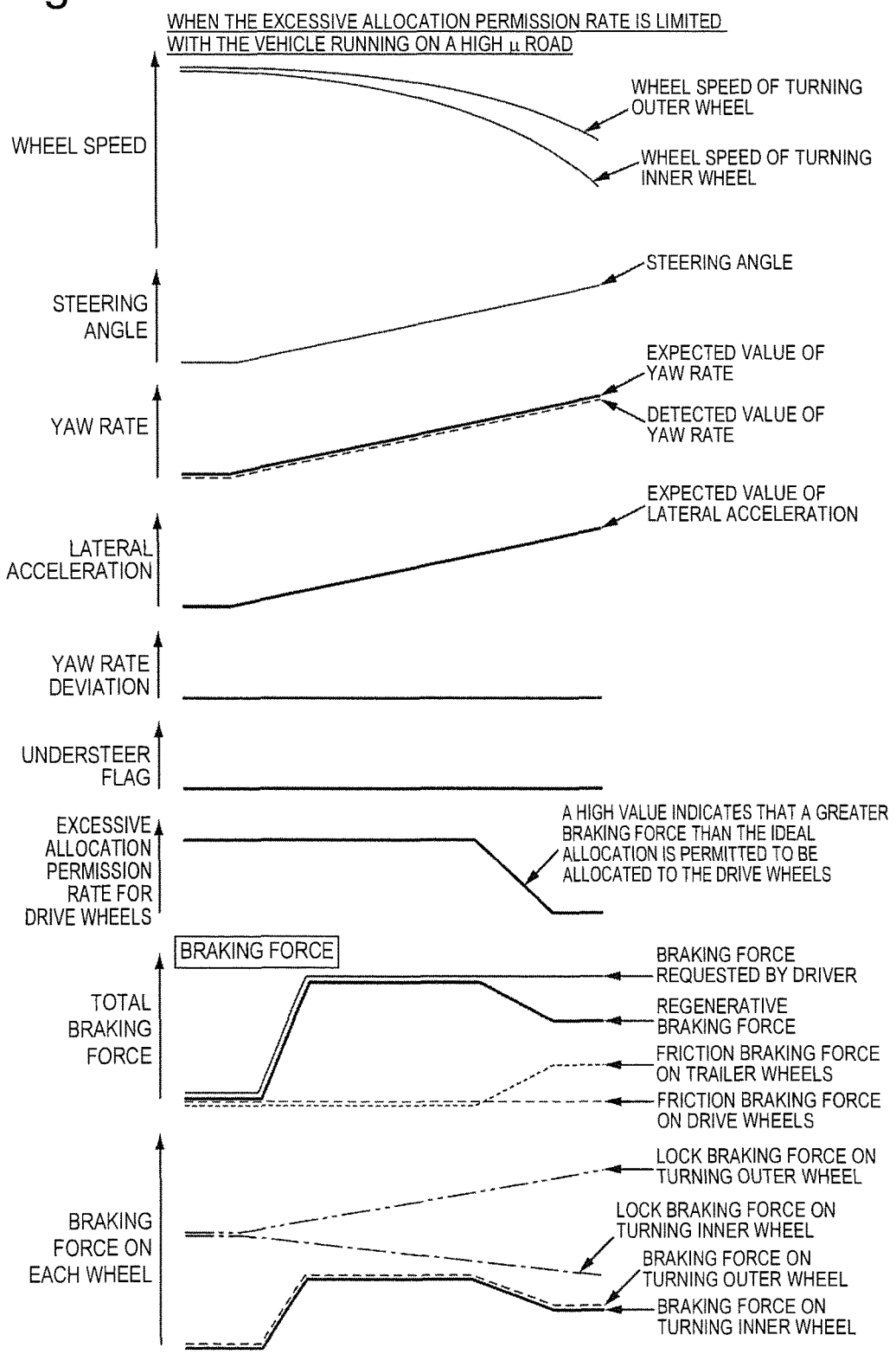
FIG. 7 is a timing diagram when the excessive allocation permission rate is limited based on the expected value of the lateral acceleration according to the first embodiment.

FIG. 7 is a timing diagram when the excessive allocation permission rate is limited based on the expected value of the lateral acceleration according to the first embodiment. FIG. 7 indicates that the vehicle is shifting to the turning state while being braked. Further, the vehicle is running on the high μ road. The excessive allocation permission rate p is set to 100% first. As the braking force, the braking force requested by the driver is entirely achieved by the regenerative braking force. Therefore, FIG. 7 illustrates the vehicle with no braking force generated at the driving and trailer wheels by the hydraulic brake. When the vehicle is turned, the load is moved to the turning outer wheel side and is reduced on the turning inner wheel side. The actual yaw rate of the vehicle almost matches the expected value of the yaw rate, with no yaw rate deviation generated. However, the expected value of the lateral acceleration is increased, so that the excessive allocation permission rate for the drive wheels starts to be reduced from 100%. As a result, the allocation of the braking force to the drive wheel side is reduced, and the driving force corresponding to this reduction is achieved by the hydraulic brake on the trailer wheel side. Therefore, the braking force to the drive wheel can be reduced, which can prevent the lock braking force from falling below the braking force applied to the drive wheel on the turning inner wheel side even when being reduced on the turning inner wheel side, thereby preventing the drive wheel from being locked at the early stage.

(Regarding Excessive Allocation Permission Rate based on Yaw Rate Deviation)

Figure 8:
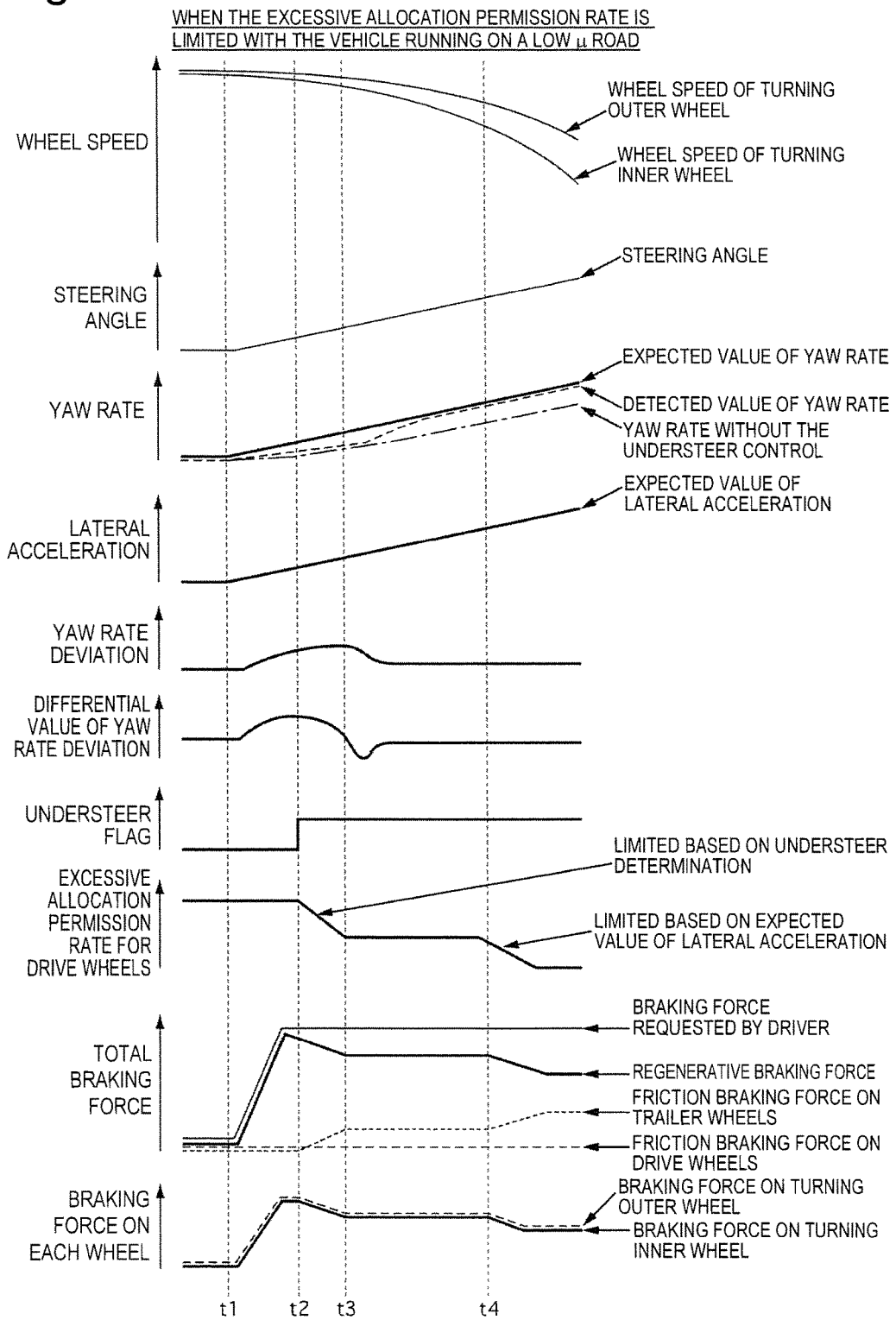
FIG. 8 is a timing diagram when the excessive allocation permission rate is limited based on the yaw rate deviation according to the first embodiment.

FIG. 8 is a timing diagram when the excessive allocation permission rate is limited based on the yaw rate deviation according to the first embodiment. FIG. 8 indicates that the vehicle is in the turning state while being braked. Further, the vehicle is running on the low μ road. The excessive allocation permission rate p is set to 100% first. As the braking force, the braking force requested by the driver is entirely achieved by the regenerative braking force. Therefore, FIG. 8 illustrates the vehicle with no braking force generated at the driving and trailer wheels by the hydraulic brake. At time t1, when the driver steers a steering wheel to turn the vehicle, the yaw rate is generated. Since the vehicle is running on the low μ road, the cornering force cannot be sufficiently acquired on the front wheel side, so that the detected value of the yaw rate deviates from the expected value of the yaw rate, leading to generation of the yaw rate deviation. At time t2, when the yaw rate deviation reaches or exceeds the threshold value prepared for determining the understeer, the understeer determination unit 500d outputs the ON signal. At this time, with the yaw rate deviation increasing, the differential value of the yaw rate deviation is also zero or larger, so that the excessive allocation permission rate is limited based on the understeer determination. As a result, the allocation of the braking force to the drive wheels is reduced, and the braking force corresponding to the reduction is replaced with the braking force generated at the trailer wheels by the hydraulic brake. Therefore, the regenerative braking force is reduced and the cornering force can be secured on the drive wheel, which prevents or reduces expansion of the yaw rate deviation.

At time t3, when the differential value of the yaw rate deviation becomes a negative value, the excessive allocation permission rate is kept at a constant value because the negative value means that the yaw rate deviation is reducing and therefore the regenerative braking force on the drive wheels no longer has to be limited to stop or reduce the understeer. At time t4, upon an increase in the expected value of the lateral acceleration, the excessive allocation permission rate is limited based on the expected value of the lateral acceleration regardless of whether the lateral acceleration is actually generated. As a result, a further limitation is imposed on the regenerative braking force at the drive wheels, leading to an increase in the braking force generated at the trailer wheels by the hydraulic brake. At this time, if the great braking force is kept allocated to the front wheel side because the generated actual lateral acceleration is small and the load is not moved, the cornering force is reduced on the drive wheel side (the front wheel side), easily causing the understeer tendency. Therefore, the excessive allocation permission rate based on the lateral acceleration reference is reduced not based on the actual lateral acceleration but based on the expected value of the lateral acceleration. Therefore, even when the vehicle is running on the low μ road, the behavior of the vehicle can be stabilized.

In the above-described manner, the first embodiment can bring about the following advantageous effects.

(a1) The first embodiment includes the electric motor 1 configured to provide the regenerative braking force to the left and right drive wheels that are the front wheels, the hydraulic brake (a friction braking device) configured to provide the friction braking force to the left and right trailer wheels that are the rear wheels, and the understeer determination unit 500*d* (a behavior estimation unit) configured to estimate the behavior of the vehicle. The first embodiment reduces the regenerative braking force and increases the friction braking force provided by the hydraulic brake, if the understeer is estimated when the regenerative braking force is generated. Therefore, the first embodiment can prevent or reduce the destabilization of the vehicle when the understeer occurs because reducing the regenerative braking force based on the estimation of the understeer.

(a2) The first embodiment estimates the lateral acceleration that can be generated on the vehicle, based on the vehicle state, and reduces the regenerative braking force based on the estimated lateral acceleration. Therefore, the first embodiment can prevent the drive wheel on the turning inner wheel side from being locked at the early stage even when the lateral acceleration is generated as estimated while the vehicle is running on the high μ road and even when the lateral acceleration is not generated as estimated while the vehicle is running on the low μ road.

(a3) The first embodiment further includes the steering angle sensor 110*b* (a steering angle calculation unit) configured to calculate the steering angle, and the vehicle speed estimation unit 511 (a speed calculation unit) configured to calculate the speed of the vehicle or the wheel. The first embodiment estimates the lateral acceleration to be generated on the vehicle, based on the calculated steering angle and the calculated speed of the vehicle body. Therefore, the first embodiment can easily estimate the lateral acceleration.

(a4) The first embodiment further includes the yaw rate sensor 110*a* (a yaw rate calculation unit) configured to calculate the detected value of the yaw rate generated on the vehicle, and the yaw rate expected value calculation unit 512 (a yaw rate estimation unit) configured to estimate the expected value of the yaw rate based on the steering angle and the speed of the vehicle. The first embodiment determines how much to reduce the regenerative braking force according to the deviation between the calculated detected value of the yaw rate and the estimated expected value of the yaw rate if it is determined that the understeer tendency occurs. Therefore, the first embodiment can stop or reduce the understeer state because a vertical slip is reduced and the cornering force is increased on the front wheels.

(a5) The deceleration limit unit 500*n* estimates the instable behavior of the vehicle based on the longitudinal deceleration, and reduces the regenerative braking force based on the estimated deceleration. Therefore, the first embodiment can prevent the front wheels from being locked at the early stage in a high-deceleration region.

Second Embodiment

Figure 9:
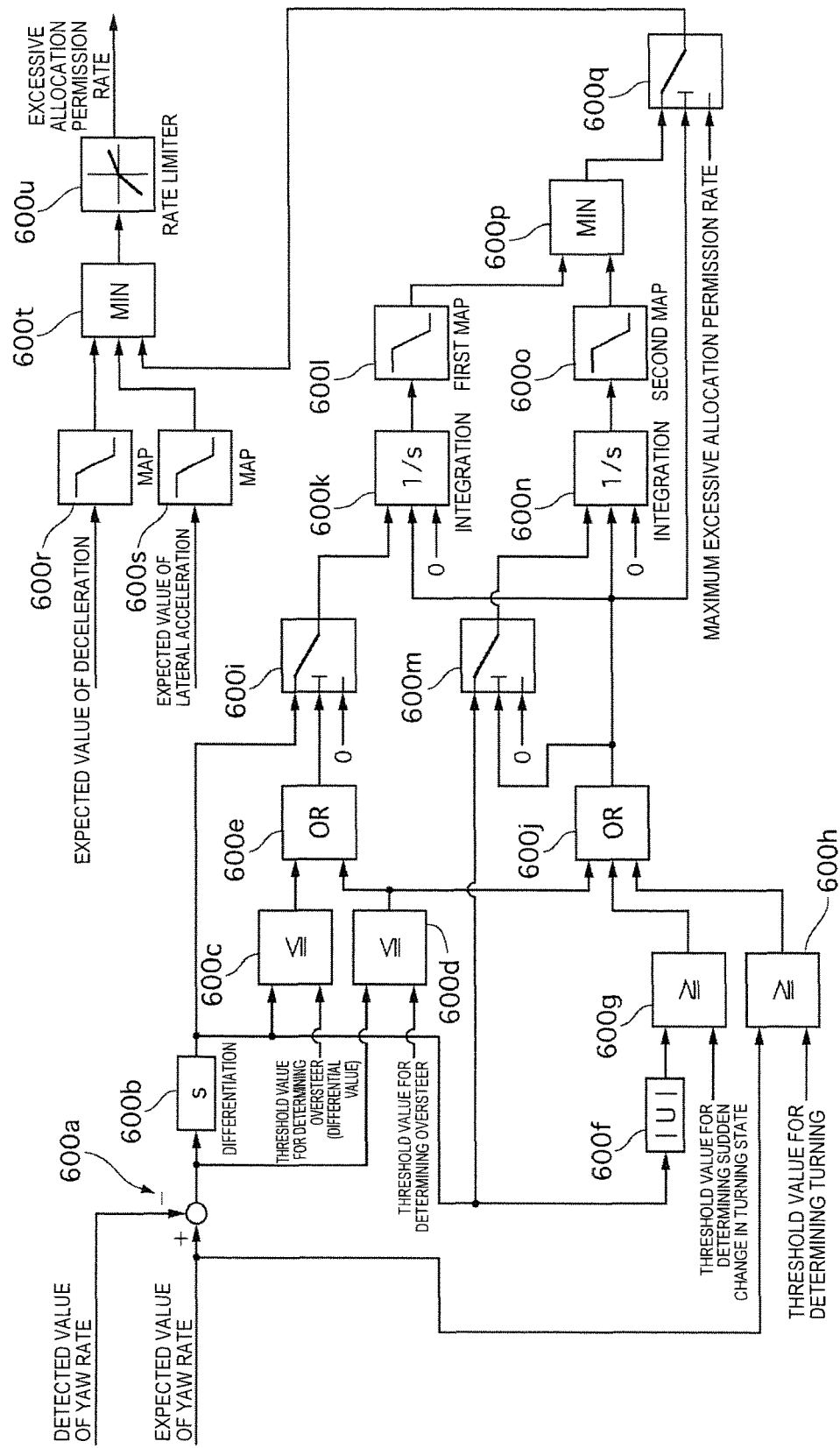
FIG. 9 is a control block diagram illustrating processing for calculating the excessive allocation permission rate according to a second embodiment.

Next, a second embodiment will be described. A basic configuration thereof is similar to the first embodiment, and therefore only a difference therefrom will be described. The first embodiment has been described as being configured to include the electric motor 1 on the front wheels, but the second embodiment will be described as being configured to include the electric motor 1 on the rear wheels. FIG. 9 is a control block diagram illustrating processing for calculating the excessive allocation permission rate according to the second embodiment. A yaw rate deviation calculation unit 600*a* calculates the yaw rate deviation, which is the difference acquired by subtracting the detected value of the yaw rate detected by the yaw rate sensor 110*a* from the expected value of the yaw rate. A deviation differentiation unit 600*b* calculates the differential value of the yaw rate deviation by differentiating the yaw rate deviation.

A yaw rate deviation differential value determination unit 600*c* determines whether the differential value of the yaw rate deviation is equal to or smaller than a threshold value prepared for determining the oversteer for differential value (for example, zero). If the differential value of the yaw rate deviation is zero or smaller, the yaw rate deviation differential value determination unit 600*c* determines that the yaw rate deviation is increasing and outputs an ON signal. On the other hand, if the differential value of the yaw rate deviation is a positive value, it is considered that the yaw rate deviation is reducing and the vehicle is shifting from the oversteer tendency to the neutral steer tendency. In this case, performing control for stopping or reducing the oversteer may cause a swinging back, so that the yaw rate deviation differential value determination unit 600*c* outputs an OFF signal in this case. An oversteer determination unit 600*d* determines whether the yaw rate deviation is equal to or larger than a preset threshold value prepared for determining the oversteer. Then, if the yaw rate deviation is equal to or larger than the threshold value prepared for determining the oversteer, the oversteer determination unit 600*d* outputs an ON signal. On the other hand, if the yaw rate deviation is smaller than the threshold value prepared for determining the oversteer, the oversteer determination unit 600*d* outputs an OFF signal.

An oversteer condition determination unit 600*e* determines whether the yaw rate deviation differential value determination unit 600*c* outputs the ON signal or the oversteer determination unit 600*d* outputs the ON signal. If any of the conditions is satisfied, the oversteer condition determination unit 600*e* outputs an ON signal. On the other hand, if none of the conditions is satisfied, the oversteer condition determination unit 600*e* outputs an OFF signal.

An absolute value calculation unit 600*f* calculates the absolute value of the differential value of the yaw rate deviation. A turning state sudden change determination unit 600*g* determines whether the absolute value of the differential value of the yaw rate deviation is equal to or larger than a preset threshold value prepared for determining the sudden change in the turning state. If the absolute value of the differential value of the yaw rate deviation is equal to or larger than the threshold value prepared for determining the sudden change in the turning state, the turning state sudden change determination unit 600g determines that the turning state is suddenly changed and outputs an ON signal. On the other hand, if the absolute value of the differential value of the yaw rate deviation is smaller than the threshold value prepared for determining the sudden change in the turning state, the turning state sudden change determination unit 600g determines that the turning state is stabilized and outputs an OFF signal. A turning determination unit 600h determines whether the expected value of the yaw rate is equal to or larger than a preset threshold value prepared for determining the tuning. If the expected value of the yaw rate is equal to or larger than the threshold value prepared for determining the tuning, the turning determination unit 600h determines that the driver is indicating his/her intension to turn the vehicle, and outputs an ON signal. On the other hand, if the expected value of the yaw rate is smaller than the threshold value prepared for determining the tuning, the turning determination unit 600h determines that the driver does not have an intension to turn the vehicle, and outputs an OFF signal.

A vehicle behavior determination unit 600i switches an output thereof based on the ON/OFF signal from the oversteer condition determination unit 600e. By this switching, the vehicle behavior determination unit 600i outputs the differential value of the yaw rate deviation if the oversteer condition determination unit 600e outputs the ON signal. On the other hand, the vehicle behavior determination unit 600i outputs zero if the oversteer condition determination unit 600e outputs the OFF signal. A turning state determination unit 600j outputs an ON signal, if any of the conditions, the output of the ON signal from the oversteer determination unit 600d, the output of the ON signal from the turning state sudden change determination unit 600g, and the output of the ON signal from the turning determination unit 600h is satisfied. On the other, the turning state determination unit 600j outputs an OFF signal if none of the conditions is satisfied. A first integration unit 600k switches an output thereof based on the ON/OFF signal from the turning state determination unit 600j. By this switching, the first integration unit 600k integrates the differential value of the yaw rate deviation and outputs the integral value as the yaw rate deviation if the turning state determination unit 600j outputs the ON signal, because the vehicle is being turned at this time. On the other hand, the first integration unit 600k determines that the vehicle is not being turned and outputs zero if the turning state determination unit 600j outputs the OFF signal.

A first excessive allocation permission rate map 600l outputs the excessive allocation permission rate from a preset map, based on the calculated integral value. The excessive allocation permission rate indicates a rate at which the braking force allocated to the front wheel side is reduced from ideal allocation of the braking force between the front and rear wheels, and the reduced braking force is allocated to the rear wheel side. For example, if the yaw rate deviation is small and the intension to turn the vehicle is not clear, the cornering force is not necessary so much on the rear wheel side. Therefore, the braking force is permitted to be allocated to the rear wheel side as much as possible. In other words, the excessive allocation permission rate is increased, so that the power is collected at a higher rate. On the other hand, if the yaw rate deviation is large and the oversteer tendency or the intention to turn the vehicle is clear, the cornering force is required on the rear wheel side. Therefore, a limitation is imposed on the allocation of the braking force to the rear wheel side. In other words, the excessive allocation permission rate is reduced (the value set when the integral value is zero: this rate may be a low predetermined permission rate or may be even zero), so that the turning capability is secured.

A vehicle behavior sudden change determination unit 600n switches an output thereof based on the ON/OFF signal from the turning state determination unit 600j. By this switching, the vehicle behavior sudden change determination unit 600n outputs the differential value of the yaw rate deviation if the turning state determination unit 600j outputs the ON signal. On the other hand, the vehicle behavior sudden change determination unit 600n outputs zero if the turning state determination unit 600j outputs the OFF signal. A second integration unit 600n switches an output thereof based on the ON/OFF signal from the turning state determination unit 600j. By this switching, the second integration unit 600n integrates the differential value of the yaw rate deviation and outputs the integral value as the yaw rate deviation if the turning state determination unit 600j outputs the ON signal, because the vehicle is turning in this case. On the other hand, the second integration unit 600n determines that the vehicle is not turning and outputs zero if the turning state determination unit 600j outputs the OFF signal. A second excessive allocation permission rate map 600o outputs the excessive allocation permission rate from a preset map, based on the calculated integral value. This second excessive allocation permission rate map limits the excessive allocation permission rate at an earlier stage compared to the first excessive allocation permission rate map. For example, if the yaw rate deviation is small and the intention to turn the vehicle is not clear, the excessive allocation permission rate is not limited by the first excessive allocation permission rate map. However, if the turning state is suddenly changed, the allocation of the braking force to the rear wheel side is reduced at the earlier stage based on the second excessive allocation permission rate map, by which the turning capability can be secured.

A primary excessive allocation permission rate setting unit 600p calculates a primary excessive allocation permission rate based on the yaw rate deviation by selecting a lower one of the excessive allocation permission rate, set by the first excessive allocation permission rate map 600l and the excessive allocation permission rate set by the second excessive allocation permission rate map 600o. A maximum excessive allocation permission rate limit unit 600q switches an output thereof based on the ON/OFF signal from the turning state determination unit 600j. By this switching, the maximum excessive allocation permission rate limit unit 600q outputs a preset maximum excessive allocation permission rate if the turning state determination unit 600j outputs the ON signal. On the other hand, the maximum excessive allocation permission rate limit unit 600q outputs the primary excessive allocation permission rate set by the primary excessive allocation permission rate setting unit 600q if the turning state determination unit 600j outputs the OFF signal. The maximum excessive allocation permission rate is a value that limits a maximum value when the braking force is allocated to the rear wheel side. Therefore, the maximum excessive allocation permission rate may be set in such a manner that the braking force is allocated to the rear wheel side slightly more largely than the ideal allocation of the braking force, or the maximum excessive allocation permission rate may be set in such a manner that the braking force is allocated to the front wheel side slightly more largely than the ideal allocation of the braking force.

A deceleration limit unit 600*r* outputs a excessive allocation permission rate based on the deceleration from a preset map, based on the calculated expected value of the deceleration. When the expected value of the deceleration is large, the excessive allocation permission rate is reduced. By this reduction, the drive wheels are prevented from being locked at an early stage due to a movement of the load to the front wheel side when the vehicle is running on the high μ road. On the other hand, when the expected value of the deceleration is small, the load is only slightly moved to the front wheel side and therefore the drive wheels are less likely locked, whereby the excessive allocation permission rate is increased, so that the power can be collected at a higher rate.

A lateral acceleration limit unit 600*s* outputs the excessive allocation permission rate based on the lateral acceleration from a preset map, based on the calculated expected value of the lateral acceleration. By this output, the drive wheels are prevented from being locked at the early stage when the vehicle is running on the high μ road. At this time, the excessive allocation permission rate based on the lateral acceleration is calculated not with use of the actual lateral acceleration but with use of the expected value of the lateral acceleration for the following reason. Assume that the vehicle is being turned with the braking force largely allocated to the rear wheel side. When the vehicle is running on the high μ road, the lateral acceleration is actually generated, whereby a turning inner wheel side is subject to a reduced load and therefore is easily locked. Therefore, increasing the allocation of the braking force to the rear wheel side is not desirable when the lateral acceleration is large, whereby the excessive allocation permission rate based on the lateral acceleration is reduced when the expected value of the lateral acceleration is large. When the vehicle is running on the high μ road, a result is not changed so much between the control using the actual lateral acceleration and the control using the expected value of the lateral acceleration. However, when the vehicle is running on the low μ road, the actually generated lateral acceleration is not as large as the expected value of the lateral acceleration. At this time, increasing the allocation of the braking force to the rear wheel side because the generated actual lateral acceleration is small results in a reduction in the cornering force on the rear wheel side, easily leading to the oversteer tendency. Therefore, in this case, the excessive allocation permission rate based on the lateral acceleration is also reduced. In other words, calculating the excessive allocation permission rate based on the lateral acceleration with use of the expected value of the lateral acceleration can realize the stabilization of the behavior of the vehicle regardless of μ on the road surface.

An excessive allocation permission rate setting unit 600*t* calculates a final excessive allocation permission rate by selecting a lowest one of the excessive allocation permission rate based on the deceleration, the excessive allocation permission rate based on the lateral acceleration, and the excessive allocation permission rate output from the maximum excessive allocation permission rate limit unit 600*m*. A rate limit unit 600*u* limits a rate at which the final excessive allocation permission rate output from the excessive allocation permission rate setting unit 600*t* is changed from a previous excessive allocation permission rate, to a predetermined change rate or lower. Therefore, if the change rate is equal to or lower than the predetermined change rate, the final excessive allocation permission rate is directly output. If the change rate is higher than the predetermined change rate, a predetermined change rate is output. This output can prevent or reduce a sudden change in the allocation of the braking force between the front and rear wheels, thereby realizing the stabilization of the behavior of the vehicle.

In the above-described manner, the second embodiment can bring about the following advantageous effects.

(b1) The second embodiment includes the electric motor 1 configured to provide the regenerative braking force to the left and right drive wheels that are the rear wheels, the hydraulic brake (the friction braking device) configured to provide the friction braking force to the left and right trailer wheels that are the front wheels, and the oversteer determination unit 600*d* (the behavior estimation unit) configured to estimate the behavior of the vehicle. The second embodiment reduces the regenerative braking force and increases the friction braking force provided by the hydraulic brake, if the oversteer is estimated when the regenerative braking force is generated.

Therefore, the second embodiment can prevent or reduce the destabilization of the vehicle when the oversteer occurs because reducing the regenerative braking force based on the estimation of the oversteer.

(b2) The second embodiment further includes the yaw rate sensor 110*a* (the yaw rate calculation unit) configured to calculate the detected value of the yaw rate generated on the vehicle, and the yaw rate expected value calculation unit 512 (the yaw rate estimation unit) configured to estimate the expected value of the yaw rate based on the detected steering angle and the detected speed of the vehicle body. The second embodiment determines how much to reduce the regenerative braking force according to the deviation between the calculated detected value of the yaw rate and the estimated expected value of the yaw rate if it is determined that the oversteer tendency occurs. Therefore, the second embodiment can stop or reduce the oversteer state because a vertical slip is reduced and a lateral force is increased on the rear wheels.

(b3) The second embodiment includes the first excessive allocation permission rate map 600*l* configured to reduce the regenerative braking force and increase the friction braking force provided by the hydraulic brake if the turning state of the vehicle is estimated to have the oversteer tendency when the regenerative braking force is generated, and the second excessive allocation permission rate map 600*o* configured to reduce the regenerative braking force more largely than the first excessive allocation permission rate map 600*l* and increase the friction braking force provided by the hydraulic brake according to the deviation between the detected value of the yaw rate and the expected value of the yaw rate if the turning state is suddenly changed. Therefore, the second embodiment can prevent or reduce the destabilization of the vehicle when the oversteer occurs. In addition, the second embodiment can prevent or reduce in advance the destabilization of the vehicle when the oversteer may occur, by actively reducing the regenerative braking force when there is the risk that the behavior of the vehicle may be suddenly changed.

(b4) The second embodiment estimates the lateral acceleration that can be generated on the vehicle, based on the vehicle state, and reduces the regenerative braking force based on the estimated lateral acceleration. Therefore, the second embodiment can prevent the drive wheel on the turning inner wheel side from being locked at the early stage even when the lateral acceleration is generated as estimated while the vehicle is running on the high μ road and even when the lateral acceleration is not generated as estimated while the vehicle is running on the low μ road.

(b5) The deceleration limit unit 600r estimates the instable behavior of the vehicle based on the longitudinal deceleration, and reduces the regenerative braking force based on the estimated deceleration. Therefore, the second embodiment can prevent the rear wheels from being locked at the early stage in the high-deceleration region.

Technical Ideas Recognizable from Embodiments

Now, technical ideas recognizable from the vehicle control apparatuses described in the first and second embodiments will be listed.

(1) A vehicle control apparatus includes an electric motor configured to provide a regenerative braking force to left and right drive wheels that are one of front wheels and rear wheels, a friction braking device configured to provide a friction braking force to left and right trailer wheels that are the other of the front wheels and the rear wheels, and a behavior estimation unit configured to estimate a behavior of a vehicle. The vehicle control apparatus reduces the regenerative braking force and increases the friction braking force provided by the friction braking device, if the behavior estimation unit estimates a preset behavior when the regenerative braking force is generated. Therefore, the vehicle control apparatus can prevent or reduce instability of the vehicle by estimating the behavior of the vehicle and reducing the regenerative braking force.

(2) In the vehicle control apparatus described in the above item (1), the behavior estimation unit estimates an understeer tendency when the vehicle is turned. Therefore, the vehicle control apparatus can prevent or reduce the instability of the vehicle when the understeer tendency occurs.

(3) In the vehicle control apparatus described in the above item (2), the behavior estimation unit estimates a lateral acceleration that can be generated on the vehicle, based on a vehicle state. The vehicle control apparatus reduces the regenerative braking force based on the estimated lateral acceleration. Therefore, the vehicle control apparatus can prevent the drive wheel on a turning inner wheel side from being locked at an early stage even when the lateral acceleration is generated as estimated while the vehicle is running on a high μ road and even when the lateral acceleration is not generated as estimated while the vehicle is running on a low μ road.

(4) The vehicle control apparatus described in the above item (3) further includes a steering angle calculation unit configured to calculate a steering angle, and a speed calculation unit configured to calculate a speed of the vehicle or the wheel. The behavior estimation unit estimates the lateral acceleration to be generated on the vehicle, based on the calculated steering angle and the calculated speed. Therefore, the vehicle control apparatus can easily estimate the lateral acceleration.

(5) In the vehicle control apparatus described in the above item (2), the electric motor is configured to generate the regenerative braking force on the left and right wheels that are the front wheels. The vehicle control apparatus further includes a yaw rate calculation unit configured to calculate a yaw rate generated on the vehicle, a steering angle calculation unit configured to calculate a steering angle, a speed calculation unit configured to calculate a speed of the vehicle or the wheel, and a yaw rate estimation unit configured to estimate the yaw rate based on the detected steering angle and the speed. The vehicle control apparatus determines how much to reduce the regenerative braking force according to a difference between the calculated yaw rate and the estimated yaw rate if the behavior estimation unit estimates the understeer tendency. Therefore, the vehicle control apparatus can reduce the understeer tendency because a vertical slip is reduced and a cornering force is increased on the front wheels.

(6) In the vehicle control apparatus described in the above item (1), the electric motor is configured to generate the regenerative braking force on the left and right wheels that are the rear wheels. The behavior estimation unit estimates an oversteer tendency when the vehicle is turned. The vehicle control apparatus further includes a yaw rate calculation unit configured to calculate a yaw rate generated on the vehicle, a steering angle calculation unit configured to calculate a steering angle, a speed calculation unit configured to calculate a speed of the vehicle or the wheel, and a yaw rate estimation unit configured to estimate the yaw rate based on the detected steering angle and the speed. The vehicle control apparatus determines how much to reduce the regenerative braking force according to a difference between the calculated yaw rate and the estimated yaw rate if the behavior estimation unit estimates the oversteer tendency. Therefore, the vehicle control apparatus can reduce the oversteer tendency because a vertical slip is reduced and a cornering force is increased on the rear wheels.

(7) In the vehicle control apparatus described in the above item (1), the behavior estimation unit reduces the regenerative braking force based on a longitudinal deceleration. Therefore, the vehicle control apparatus can prevent the drive wheels from being locked at an early stage in a high-deceleration region.

(8) The vehicle control apparatus described in the above item (7) further includes a brake operation state calculation unit configured to calculate an operation state of a brake operation member operated by a driver. The behavior estimation unit calculates a braking force requested by the driver from the calculated operation state, and the vehicle control apparatus reduces the regenerative braking force if the calculated braking force requested by the driver is equal to or greater than a preset braking force. Therefore, the vehicle control apparatus can prevent the drive wheels from being locked at the early stage in the high-deceleration region.

(9) In the vehicle control apparatus described in the above item (1), the electric motor is configured to generate the regenerative braking force on the left and right wheels that are the front wheels. The behavior estimation unit estimates an understeer tendency when the vehicle is turned. The vehicle control apparatus further includes a yaw rate calculation unit configured to calculate a yaw rate generated on the vehicle, a steering angle calculation unit configured to calculate a steering angle, a speed calculation unit configured to calculate a speed of the vehicle or the wheel, a yaw rate estimation unit configured to estimate the yaw rate based on the detected steering angle and the speed. The vehicle control apparatus further includes first control of reducing the regenerative braking force by a first amount and increasing the friction braking force provided by the friction braking device by the first amount if the behavior estimation unit estimates the understeer tendency when the vehicle is turned with the regenerative braking force generated, and second control of estimating a lateral acceleration that can be generated on the vehicle, based on a vehicle state and reducing the regenerative braking force by a second amount according to the estimated lateral acceleration. Therefore, the vehicle control apparatus can prevent or reduce the destabilization of the vehicle when the understeer occurs because reducing the regenerative braking force based on the estimation of the understeer. Further, the vehicle control apparatus can prevent the drive wheel on a turning inner wheel side from being locked at an early stage even when the lateral acceleration is generated as estimated while the vehicle is running on a high μ road and even when the lateral acceleration is not generated as estimated while the vehicle is running on a low μ road.

(10) A vehicle control apparatus includes an electric motor configured to provide a regenerative braking force to one of a pair of front left and right wheels and a pair of rear left and right wheels. The one is configured as drive wheels. The vehicle control apparatus further includes a friction braking device configured to provide a friction braking force to left and right trailer wheels, which are the other of the pairs, a turning behavior estimation unit configured to estimate a turning behavior that can be generated when the vehicle is turned, and a drive wheel braking force excessive allocation stop/reduction control unit configured to reduce the regenerative braking force and increase the friction braking force provided by the friction control device if the turning behavior estimation unit estimates a turning instable behavior when regenerative braking is applied to the one of the pairs of wheels. Therefore, the vehicle control apparatus can prevent or reduce destabilization of the vehicle by estimating the behavior when the vehicle is turned and reducing the regenerative braking force.

(11) In the vehicle control apparatus described in the above item (10), the turning behavior estimation unit estimates a lateral acceleration that can be generated on the vehicle, based on a vehicle state. The vehicle control apparatus reduces the regenerative braking force according to the estimated lateral acceleration. Therefore, the vehicle control apparatus can prevent the drive wheel on a turning inner wheel side from being locked at an early stage even when the lateral acceleration is generated as estimated while the vehicle is running on a high μ road and even when the lateral acceleration is not generated as estimated while the vehicle is running on a low μ road.

(12) The vehicle control apparatus described in the above item (11) further includes a steering angle calculation unit configured to calculate a steering angle, and a speed calculation unit configured to calculate a speed of the vehicle or the wheel. The turning behavior estimation unit estimates the lateral acceleration to be generated on the vehicle, based on the calculated steering angle and the calculated speed. Therefore, the vehicle control apparatus can easily estimate the lateral acceleration.

(13) In the vehicle control apparatus described in the above item (10), the electric motor is configured to generate the regenerative braking force on the left and right wheels that are the front wheels. The vehicle control apparatus further includes a yaw rate calculation unit configured to calculate a yaw rate generated on the vehicle, a steering angle calculation unit configured to calculate a steering angle, a speed calculation unit configured to calculate a speed of the vehicle or the wheel, and a yaw rate estimation unit configured to estimate the yaw rate based on the detected steering angle and the speed. The drive wheel braking force excessive allocation stop/reduction control unit determines how much to reduce the regenerative braking force according to a difference between the calculated yaw rate and the estimated yaw rate if the turning behavior estimation unit estimates an understeer tendency. Therefore, the vehicle control apparatus can reduce the understeer state because a vertical slip is reduced and a cornering force is increased on the front wheels.

(14) In the vehicle control apparatus described in the above item (10), the electric motor is configured to generate the regenerative braking force on the left and right wheels that are the rear wheels. The turning behavior estimation unit estimates an oversteer tendency when the vehicle is turned. The vehicle control apparatus further includes a yaw rate calculation unit configured to calculate a yaw rate generated on the vehicle, a steering angle calculation unit configured to calculate a steering angle, a speed calculation unit configured to calculate a speed of the vehicle or the wheel, and a yaw rate estimation unit configured to estimate the yaw rate based on the detected steering angle and the speed. The drive wheel braking force excessive allocation stop/reduction control unit determines how much to reduce the regenerative braking force according to a difference between the calculated yaw rate and the estimated yaw rate if the turning behavior estimation unit estimates the oversteer tendency. Therefore, the vehicle control apparatus can reduce the oversteer state because a vertical slip is reduced and a cornering force is increased on the rear wheels.

(15) In the vehicle control apparatus described in the above item (10), the electric motor is configured to generate the regenerative braking force on the left and right wheels that are the rear wheels. The turning behavior estimation unit estimates an oversteer tendency when the vehicle is turned. The vehicle control apparatus further includes a yaw rate calculation unit configured to calculate a yaw rate generated on the vehicle, a steering angle calculation unit configured to calculate a steering angle, a speed calculation unit configured to calculate a speed of the vehicle or the wheel, and a yaw rate estimation unit configured to estimate the yaw rate based on the detected steering angle and the speed. The drive wheel braking force excessive allocation stop/reduction control unit includes first control of reducing the regenerative braking force by a first amount and increasing the friction braking force provided by the friction braking device by the first amount if the turning behavior estimation unit estimates the oversteer tendency with the vehicle turned when the regenerative braking force is generated, and second control of reducing the regenerative braking force by a second amount according to a difference between the calculated yaw rate and the estimated yaw rate and increasing the friction braking force provided by the friction braking device by the second amount. Therefore, the vehicle control apparatus can prevent or reduce the destabilization of the vehicle when the oversteer occurs.

(16) A vehicle control method includes an electric motor configured to provide a regenerative braking force to one of a pair of front left and right wheels and a pair of rear left and right wheels. The one is configured as drive wheels. The vehicle control method further includes a friction braking device configured to provide a friction braking force to left and right trailer wheels that are the other of the pairs, a steer tendency estimation unit configured to estimate an understeer tendency or an oversteer tendency that can be generated when a vehicle is turned. The vehicle control method further includes reducing the regenerative braking force and increasing the friction braking force if the understeer tendency or the oversteer tendency is estimated when regenerative braking is applied. Therefore, the vehicle control method can prevent or reduce destabilization of the vehicle when the vehicle is turned.

(17) The vehicle control method described in the above item (16) further includes estimating a lateral acceleration that can be generated on the vehicle from a vehicle state and reducing the regenerative braking force according to the estimated lateral acceleration. Therefore, the vehicle control method can prevent the drive wheel on a turning inner wheel side from being locked at an early stage even when the lateral acceleration is generated as estimated while the vehicle is running on a high μ road and even when the lateral acceleration is not generated as estimated while the vehicle is running on a low μ road.

(18) The vehicle control method described in the above item (16) further includes estimating a lateral acceleration to be generated on the vehicle, based on a steering angle and a speed of the vehicle. Therefore, the vehicle control method allows the lateral acceleration to be easily estimated.

(19) In the vehicle control method described in the above item (16), the electric motor is configured to generate the regenerative braking force on the front left and right wheels. The vehicle control method further includes calculating an actual yaw rate generated on the vehicle, estimating the yaw rate based on a detected steering angle and a speed of the vehicle, and determining how much to reduce the regenerative braking force according to a difference between the calculated yaw rate and the estimated yaw rate if the steer tendency estimation unit estimates the understeer tendency. Therefore, the vehicle control method can prevent or reduce the destabilization of the vehicle when the understeer occurs because reducing the regenerative braking force based on the estimation of the understeer.

(20) In the vehicle control method described in the above item (16), the electric motor is configured to generate the regenerative braking force on the rear left and right wheels. The vehicle control method further includes calculating an actual yaw rate generated on the vehicle, estimating the yaw rate based on a detected steering angle and a speed of the vehicle, and determining how much to reduce the regenerative braking force according to a difference between the calculated yaw rate and the estimated yaw rate if the steer tendency estimation unit estimates the oversteer tendency. Therefore, the vehicle control method can prevent or reduce the destabilization of the vehicle when the oversteer occurs because reducing the regenerative braking force based on the estimation of the oversteer.

According to the above-described embodiments, the braking force excessively allocated to the drive wheels can be eliminated or reduced, which can stabilized the behavior of the vehicle.

Having described only several embodiments of the present invention, those skilled in the art can easily appreciate that the above-described embodiments can be changed or improved in various manners without substantially departing from the novel teachings and advantages of the present invention. Therefore, such embodiments changed or improved in various manners are also intended to be contained in the technical scope of the present invention.

Having described how the present invention can be embodied based on several examples, the above-described embodiments of the present invention are intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2014-077698 filed on Apr. 4, 2014. The entire disclosure of Japanese Patent Application No. 2014-077698 filed on Apr. 4, 2014 including the specification, the claims, the drawings, and the summary is incorporated herein by reference in its entirety.

The entire disclosure of Japanese Patent Application Public Disclosure No. 2012-60753 (Patent Literature 1) including the specification, the claims, the drawings, and the summary is incorporated herein by reference in its entirety.

REFERENCE SIGNS LIST 1 electric motor
3 differential gear
3a speed reduction mechanism
4 drive shaft
5 hydraulic unit
9 wheel speed sensor
10 inverter
50 brake controller
60 battery controller
100 motor controller
110 vehicle controller
110a yaw rate sensor
110b steering angle sensor
W/C wheel cylinder

The invention claimed is:

1. A vehicle control apparatus for a vehicle including an electric motor configured to provide a regenerative braking force to left and right drive wheels that are one of front wheels and rear wheels, and a friction braking device configured to provide a friction braking force to left and right trailer wheels that are the other of the front wheels and the rear wheels, the vehicle control apparatus comprising:
  a yaw rate sensor configured to determine a yaw rate generated by the vehicle;
  a steering angle sensor configured to determine a steering angle; and
  at least one controller configured to
    calculate an expected value of a lateral acceleration to be generated by the vehicle, based on the steering angle and a speed of the vehicle;
    determine a reduced braking force in accordance with an excessive allocation permission rate, which is a rate at which the braking force allocated to a trailer wheel side is reduced with respect to a drive wheel braking force, according to a desired allocation of the braking force between the front wheels and the rear wheels, and cause the reduced braking force to be allocated to a drive wheel side;
    reduce the regenerative braking force and increase the friction braking force provided by the friction braking device by an amount corresponding to a reduced amount of the regenerative braking force, when the regenerative braking force is generated and the expected value is equal to or larger than a predetermined value representing an intention of a driver to turn the vehicle;
    estimate an understeer tendency when the vehicle is turned;
    calculate the speed of the vehicle or at least one wheel of the vehicle;
    estimate the yaw rate based on the determined steering angle and the speed;
    perform a first control of reducing the regenerative braking force by a first amount and increasing the friction braking force provided by the friction braking device by the first amount when the understeer tendency is estimated when the vehicle is turned with the regenerative braking force being generated; and perform a second control of estimating a lateral acceleration that can be generated by the vehicle, based on at least a vehicle state, and reducing the regenerative braking force by a second amount according to the estimated lateral acceleration, wherein the electric motor is configured to generate the regenerative braking force on the left and right wheels that are the front wheels.

2. The vehicle control apparatus according to claim 1, further comprising:
a speed sensor configured to determine the speed of the vehicle or the at least one wheel of the vehicle,
wherein the at least one controller is configured to estimate the lateral acceleration to be generated by the vehicle, based on the determined steering angle and the determined speed.

3. The vehicle control apparatus according to claim 1, wherein the at least one controller is configured to
determine how much to reduce the regenerative braking force according to a difference between the determined yaw rate and the estimated yaw rate when the understeer tendency is estimated.

4. The vehicle control apparatus according to claim 1, wherein the at least one controller is configured to
estimate an oversteer tendency when the vehicle is turned, and
determine how much to reduce the regenerative braking force according to a difference between the determined yaw rate and the estimated yaw rate when the oversteer tendency is estimated.

5. The vehicle control apparatus according to claim 1, wherein the at least one controller is configured to reduce the regenerative braking force based on a longitudinal deceleration.

6. The vehicle control apparatus according to claim 5, wherein the at least one controller is configured to
calculate an operation state of a brake operation member operated by the driver, and
calculate a braking force requested by the driver from the calculated operation state, and reduce the regenerative braking force when the calculated braking force requested by the driver is equal to or greater than a preset braking force.

7. A vehicle control apparatus for a vehicle including an electric motor configured to provide a regenerative braking force to one of a pair of front left and right wheels and a pair of rear left and right wheels, the one of the pairs being configured as drive wheels, and a friction braking device configured to provide a friction braking force to left and right trailer wheels, which are the other of the pairs, the vehicle control apparatus comprising:
a yaw rate sensor configured to determine a yaw rate generated by the vehicle,
a steering angle sensor configured to determine a steering angle, and
at least one controller configured to
estimate a turning behavior that can be generated when the vehicle is turned;
reduce the regenerative braking force and increase the friction braking force provided by the friction control device when an unstable turning behavior is estimated when regenerative braking is applied to the one of the pairs of wheels;
estimate an oversteer tendency when the vehicle is turned;

calculate a speed of the vehicle or at least one wheel of the vehicle;
estimate the yaw rate based on the determined steering angle and the speed;
perform a first control of reducing the regenerative braking force by a first amount and increasing the friction braking force provided by the friction braking device by the first amount when the oversteer tendency is estimated with the vehicle turned, when the regenerative braking force is generated; and
perform a second control of reducing the regenerative braking force by a second amount according to a difference between the determined yaw rate and the estimated yaw rate, and increasing the friction braking force provided by the friction braking device by the second amount,
wherein the electric motor is configured to generate the regenerative braking force on the left and right wheels that are the rear wheels.

8. The vehicle control apparatus according to claim 7, wherein
the at least one controller is configured to estimate a lateral acceleration that can be generated by the vehicle, based on a vehicle state, and reduce the regenerative braking force according to the estimated lateral acceleration.

9. The vehicle control apparatus according to claim 8, wherein
the at least one controller is configured to estimate the lateral acceleration to be generated by the vehicle, based on the determined steering angle and the determined speed.

10. The vehicle control apparatus according to claim 7, wherein the electric motor is configured to generate the regenerative braking force on the left and right wheels that are the front wheels, and
wherein the at least one controller is configured to determine how much to reduce the regenerative braking force according to a difference between the determined yaw rate and the estimated yaw rate when an understeer tendency is estimated.

11. The vehicle control apparatus according to claim 7, wherein
the at least one controller is configured to determine how much to reduce the regenerative braking force according to a difference between the determined yaw rate and the estimated yaw rate when the oversteer tendency is estimated.

12. A vehicle control method of controlling a vehicle including an electric motor configured to provide a regenerative braking force to one of a pair of front left and right wheels and a pair of rear left and right wheels, the one being configured as drive wheels, and a friction braking device configured to provide a friction braking force to left and right trailer wheels, which are the other of the pairs, the control method comprising:
determining a yaw rate generated by the vehicle;
determining a steering angle;
calculating an expected value of a lateral acceleration to be generated by the vehicle, based on the steering angle and a speed of the vehicle;
determining a reduced braking force in accordance with an excessive allocation permission rate, which is a rate at which the braking force allocated to a trailer wheel side is reduced with respect to a drive wheel braking force, according to a desired allocation of the braking force between the front wheels and the rear wheels, and causing the reduced braking force to be allocated to a drive wheel side, to reduce the regenerative braking force;

reducing the regenerative braking force and increasing the friction braking force by an amount corresponding to a reduced amount of the regenerative braking force, when the regenerative braking force is generated and the expected value is equal to or larger than a predetermined value representing an intention of a driver to turn the vehicle;

estimating an understeer tendency when the vehicle is turned;

calculating the speed of the vehicle or at least one wheel of the vehicle;

estimating the yaw rate based on the determined steering angle and the speed;

performing a first control of reducing the regenerative braking force by a first amount and increasing the friction braking force provided by the friction braking device by the first amount when the understeer tendency is estimated when the vehicle is turned with the regenerative braking force being generated; and performing a second control of estimating a lateral acceleration that can be generated by the vehicle, based on at least a vehicle state, and reducing the regenerative braking force by a second amount according to the estimated lateral acceleration, wherein the electric motor is configured to generate the regenerative braking force on the left and right wheels that are the front wheels.

13. The vehicle control method according to claim 12, further comprising estimating the lateral acceleration to be generated by the vehicle, based on the steering angle and the speed of the vehicle.

14. The vehicle control method according to claim 12, further comprising:

determining how much to reduce the regenerative braking force according to a difference between the determined yaw rate and the estimated yaw rate upon estimating that there is the understeer tendency when the vehicle is turned.

15. The vehicle control method according to claim 12, further comprising:

determining how much to reduce the regenerative braking force according to a difference between the determined yaw rate and the estimated yaw rate upon estimating that there is an oversteer tendency when the vehicle is turned.

* * * * *